United States Patent [19]

Dahl

[11] Patent Number: 4,541,766
[45] Date of Patent: Sep. 17, 1985

[54] DEVICE FOR HANDLING PACKS OF ELONGATED ARTICLES, ESPECIALLY LUMBER PACKS

[76] Inventor: Karl Dahl, St. Olavs Plass 1, N-Oslo 1, Norway

[21] Appl. No.: 631,517

[22] Filed: Jul. 18, 1984

Related U.S. Application Data

[63] Continuation-in-part of Ser. No. 414,339, Aug. 9, 1982, abandoned.

[51] Int. Cl.$^4$ ................................................ B65G 1/04
[52] U.S. Cl. .................................... 414/277; 414/281; 414/401
[58] Field of Search ............... 414/277, 278, 279, 280, 414/281, 282, 283, 284, 285, 396, 401, 584, 659

[56] References Cited

U.S. PATENT DOCUMENTS

| | | | |
|---|---|---|---|
| 2,538,747 | 1/1951 | Drew | 414/659 X |
| 3,318,473 | 5/1967 | Jones et al. | 414/608 |
| 3,549,025 | 12/1970 | Messner | 414/282 |
| 3,695,464 | 10/1972 | Kaji | 414/277 |
| 3,738,506 | 6/1973 | Cornford et al. | 414/273 |
| 3,941,267 | 3/1976 | Greeson | 414/660 |
| 4,010,856 | 3/1977 | Anderson | 414/280 X |
| 4,101,038 | 7/1978 | Palma | 414/396 X |
| 4,239,436 | 12/1980 | Wildenaur | 414/276 |
| 4,265,583 | 5/1981 | Baird et al. | 414/284 |

FOREIGN PATENT DOCUMENTS 1457168 12/1976 United Kingdom .

Primary Examiner—Joseph E. Valenza
Assistant Examiner—Stuart J. Millman
Attorney, Agent, or Firm—Seed and Berry

[57] ABSTRACT

A support or jig (6) for handling packs including elongated articles, especially lumber packs (2a,2b), is adapted to support the lumber pack during the handling and to be brought to an appropriate position in front of an input opening in a rack (1) for the transfer of a loading pack between the handling device (6) and the rack (1). During the transfer between the handling device and the rack, the weight of the pack gives rise to a tilting moment. Therefore, the device (6) is provided with supporting arms (10a,10b) which securely engage supporting means (11a-11e) in the rack (1) so that the handling device (6) during the transfer operation is supported in the area of the rack openings. The arms are locked in their extended positions by the load and hold the jig next to the rack, even if a tilting moment is created during transfer.

20 Claims, 8 Drawing Figures

DEVICE FOR HANDLING PACKS OF ELONGATED ARTICLES, ESPECIALLY LUMBER PACKS

REFERENCE TO RELATED APPLICATION

This application is a continuation-in-part of U.S. Ser. No. 414,339, filed Aug. 9, 1982, now abandoned.

TECHNICAL FIELD

The present invention relates to a device for handling packs of elongated articles, especially lumber packs, including a frame-like structure on which the pack can rest during the handling thereof.

DISCLOSURE OF INVENTION

When handling lumber packs, for example, in a lumber warehouse where the packs are put into racks, the handling of the packs will usually take place while the packs are resting on an elongated support. This support, which is also called a "jig," and which extends in the longitudinal direction of the pack, has a predetermined length in proportion to the pack length.

Generally, such a jig is provided with transverse rollers on which the pack rests, and the jig is adapted so that it can be lifted and moved by, for example, a forklift truck. For transfer of the pack from the jig to the rack, the truck is driven to the rack so that the jig is brought into line with the rack opening and one end of the pack is positioned as close to the rack opening as possible. The elongated pack of articles can thereafter be rolled off the jig and into the rack, which also has rollers for transferring and supporting the pack.

During transfer of the pack from the jig to a designated rack opening, when the jig is resting on the forklift truck, a weight redistribution occurs along the jig. When the pack has entered the rack opening to a certain degree and rests on only the one end of the jig, an uneven weight distribution can easily result so that the tower of the forklift truck will be subjected to large side forces, and, in the most unfavorable case, the truck will tilt. This condition is especially a problem when the loading of the rack takes place high above floor level, where the insertion of the pack usually is supervised by persons standing on provisional platforms. The forks of the truck are then at a position high above the center of gravity of the truck and a large moment for tilting is created.

An object of the present invention is to reduce the above-mentioned problem.

The object is achieved in connection with a device having supporting arms which are adapted to come into engagement with supporting means on the storage rack so that the packs of articles can be safely transferred between the handling device and the rack.

Such supporting arms secure the jig and thereby the truck from being unevenly loaded and from tilting even if the load distribution changes during the loading or unloading a lumber pack.

The the supporting arms can have any suitable shape so long as they comply with their supporting function between the jig and rack, but preferably they constitute an extension of the jig in the longitudinal direction thereof.

A simple operation of the arms can be achieved if they are telescopically received in suitable guiding means on the jig, as will be explained.

The operator can, then, after the truck has been driven to a position at a rack opening, pull out the supporting arm or arms until they engage the corresponding supporting means in the rack. At the end of each supporting arm, a hook-shaped means engages supporting irons just beneath the rack opening.

The support arms and hooks constitute an abutment means for the reaction forces which can develop in the horizontal direction in case the movement of the timber pack is blocked during the transfer. The arms usually skew under the load with respect to the guiding means to cause the arms to rest against the guide means. This contact creates a large frictional resistance against horizontal movement of the arms until the load on the arms is removed.

BRIEF DESCRIPTION OF THE DRAWINGS

In the following description, the invention will be further described, reference being had to the drawings, which illustrate an embodiment of the device.

FIG. 2a is a sectional view taken along line A—A in FIG. 2.

FIG. 2b is a detail similar to FIG. 2 which illustrates the skewed angle of the support arm and the frame or guide means.

FIGS. 3, 4, and 5 show a front view, top view, and side view, respectively, of the device according to the invention.

BEST MODE FOR CARRYING OUT THE INVENTION

Figure 1:
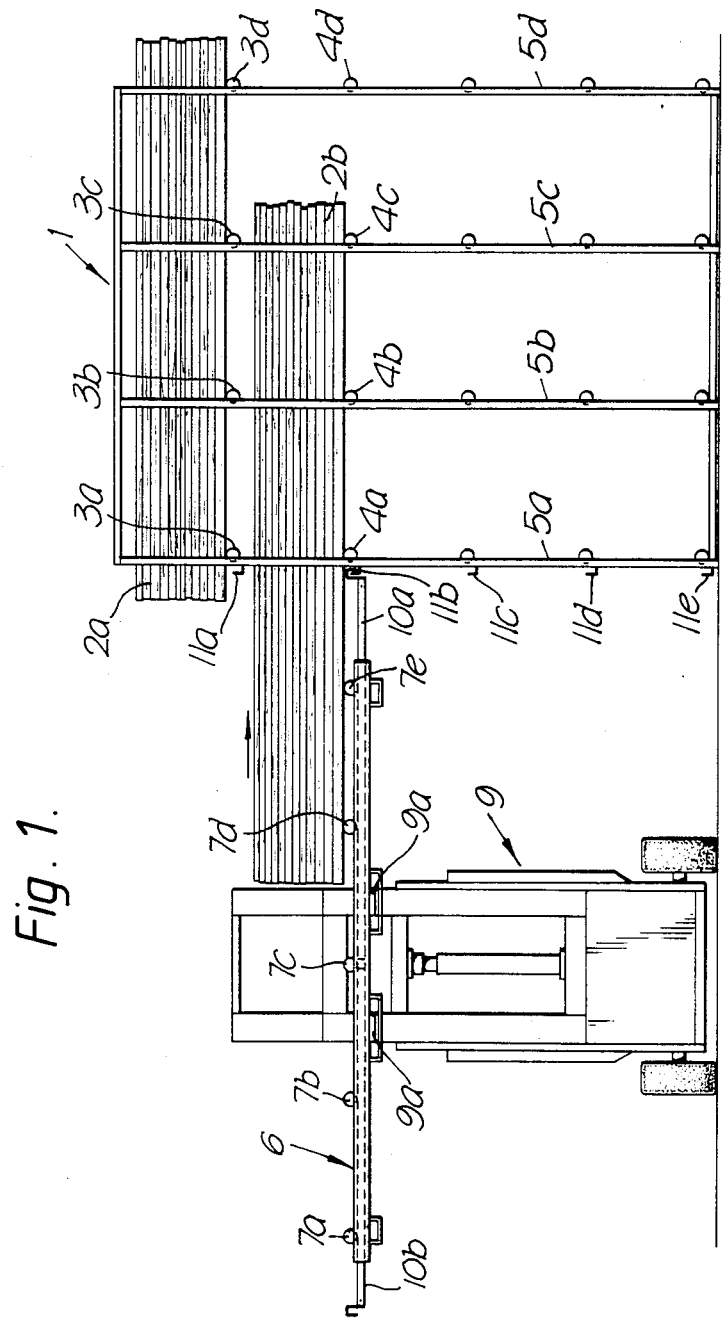
FIG. 1 is a diagrammatic view of a rack warehouse in which an embodiment of the handling device according to the invention finds application.

In FIG. 1, a warehouse rack 1 is seen from one end. The warehouse rack 1 can hold a plurality of elongated packs or articles, for example, lumber packs which are inserted or withdrawn from the rack through appropriate rack openings on one or both ends. In FIG. 1, a first lumber pack 2a is located at an upper rack level, while a second lumber pack 2b is located in the rack at an underlying rack level.

For each rack level, rack rollers 3a, 3b, 3c, 3d and 4a, 4b, 4c, 4d, etc., respectively journaled in the rack 1, assist the transfer of and support the respective lumber packs during loading and unloading. Appropriately, the rack rollers, 3a–3d, 4a–4d, are supported on vertical rack columns 5a, 5b, 5c, 5d and have a width corresponding to the predetermined rack opening.

To bring a lumber pack into position in front of a selected rack level, each pack is handled singly while resting on an elongated support or jig 6. The jig 6 is elongated and has a predetermined length corresponding to a predetermined length of the pack. The jig 6, which is further illustrated in FIGS. 3, 4, and 5, has an elongated frame structure and transverse rollers 7a–7e journaled across the frame's width in suitable yokes. The pack 2b rests (FIG. 1) on the rollers 7a–7e. The jig 6 also includes fork-receiving means 8a, 8b, transversely mounted to the frame below the rollers 7a–7e, to receive the forks 9a of a forklift truck 9 so that the jig 6 can be lifted and transported by the forklift truck with or without a lumber pack 2b, and so the pack 2b can be transferred when the jig 6 is lifted by the truck 9.

As illustrated in FIG. 1, the truck 9 is positioned next to the rack 1 so that the raised jig 6 is in line with a rack opening of the rack, the pack 2b being partly rolled off the jig 6 and being partly in position on the rollers 4a–4c of the selected rack level. The jig 6 includes extensible supporting arms 10a, 10b which are adapted to come into engagement with supporting means 11a–11e, such as transverse support irons below the rollers 4a–4c, in the warehouse rack 1. The pack 2b can then be safely transferred between the jig 6 and the rack 1, because the jig 6 is stabilized by the interconnection between the supporting arm 10a of the jig 6 and the supporting means 11b of the rack 1.

Figure 2:
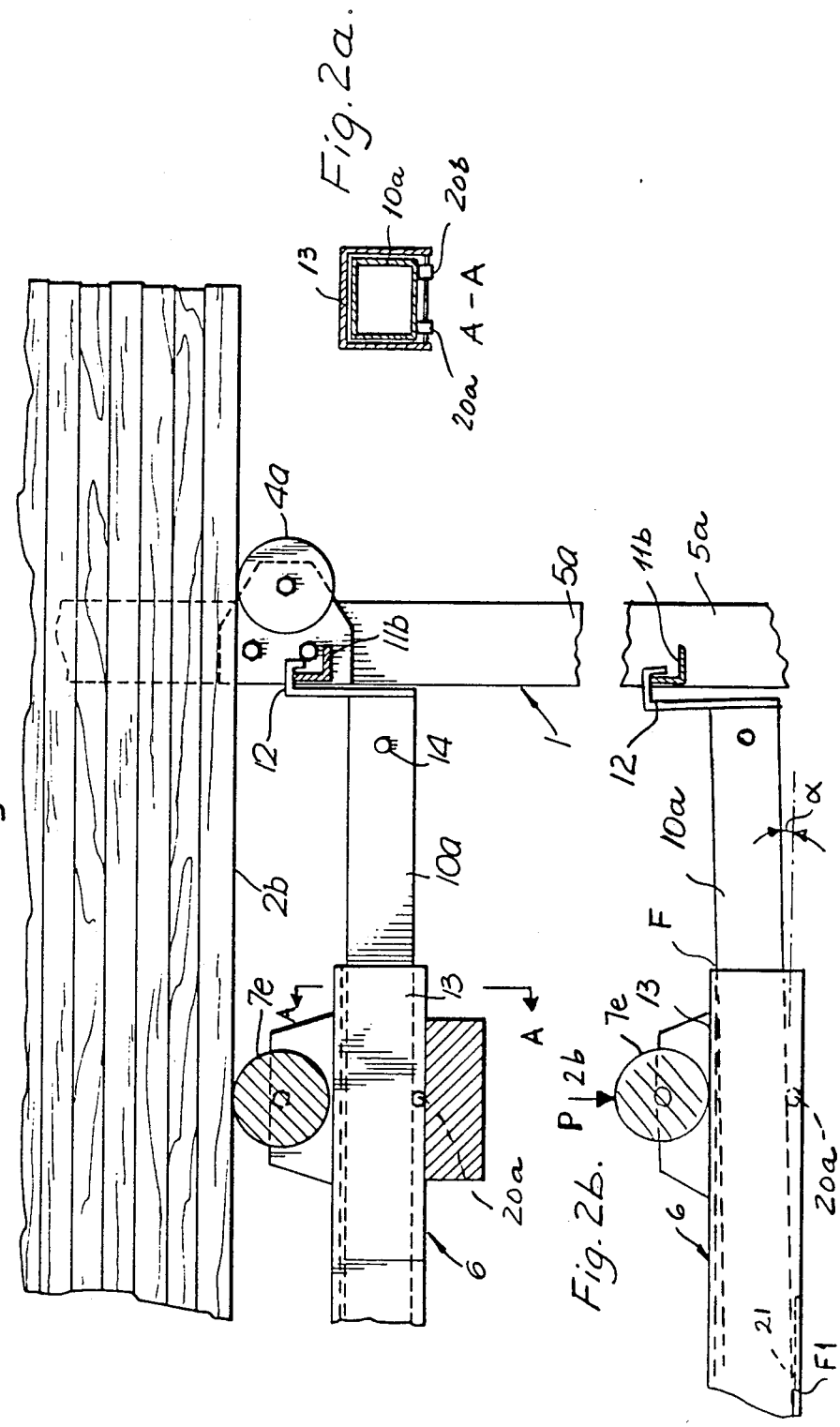
FIG. 2 illustrates, on a larger scale, a detail of the device of FIG. 1.

As shown in FIG. 2, which, on a larger scale, illustrates an end of the jig 6, the extended supporting arm 10a has a hook-shaped means 12 which is hooked onto the supporting iron 11b of the rack 1. The supporting arm 10a is adapted for telescopic displacement in a hollow guiding means 13 longitudinally mounted on the jig 6. Prior to the transfer of the pack 2b from the jig 6 to the rack 1, the support arm 10a is pulled out so that the hook 12 overlies the supporting iron 11b. Then, the forks 9a of the truck are lowered so that the arm 10a securely rests on the supporting iron 11b. The supporting arm 10a thereby prevents the jig 6 and the forklift truck 9 from being unfavorably loaded during loding or unloading of the pack 2b, even if, during the movement of the lumber pack, a great unbalance occurs which generates a large tilting moment. Without the supporting arm 10a, in the most extreme case, such a weight shift and moment could lead to the tilting of the forklift truck. Such tilting would ordinarily occur when the pack 2b had entered the rack opening to a certain degree, for example, to the degree illustrated in FIG. 1.

The supporting arm 10a securely locks the jig 6 to the rack opening to eliminate the possiblity of tilting of the truck 9 even in connection with loading at the upper rack level by rigidly interconnecting the jig and rack.

The supporting arms 10a and 10b, with their hook-shaped means 12, not only constitute a support for the pack when moving the pack in the vertical direction to keep the pack from falling between the truck and the rack, but also constitute abutment means for the reaction forces which can develop in the horizontal direction when horizontal movement of the pack is blocked during the transfer, as will be explained. The supporting arms constitute an extension of the jig in the longitudinal direction thereof. Of course, a jig 6 can also be used for loading and unloading of packs having dimensions other than those illustrated in FIG. 1. Therefore, the jig 6 can have other elongated shapes and can have the support arms located at positions other than those discussed above.

To facilitate extension of the supporting arms 10a and 10b, respectively, each supporting arm includes a handle 14. The manual force necessary to move the unloaded arm is minimized by mounting the supporting arms 10a, 10b on transverse roller bearings 20a in the guiding means 13. Grasping the handle, one can easily move the arm in or out, as desired.

A further advantage of the jig 6 is the inclusion of powered rollers 7a–7e. An electric motor 15 is illustrated schematically in FIGS. 3 and 4 by a dashed line. The electric motor 15 drives an endless chain 15a (FIG. 3) hidden within a longitudinal member of the frame. Such a hidden chain 15a allows a forklift truck 9 access to tine-receiving means 8a, 8b from either side, a fact which substantially facilitates the handling operation.

The chain 15a drives sprockets (not shown) on the rollers 7a–7e to drive the rollers.

FIG. 2a, which is a cross section taken along the line A—A of FIG. 2, shows a pair of roller bearings 20a and 20b on a common transverse shaft which bear the supporting arm 10a in the guiding means 13. Other roller bearings may also be provided at a location closer to the center of the jig 6. Of course, a single full-width roller might be used.

FIG. 2b, which is a detail similar to FIG. 2, shows how a hook-shaped means 12 at the end of the supporting arm 10a constitutes an abutment means for the reaction forces which can develop in the horizontal direction in case the movement of the timber pack is blocked during transfer. When the hook 12 is lowered onto the supporting iron 11b in the rack, the arm 10a will be displaced a few millimeters in the vertical direction relative to the guiding means 13, and this relative displacement will be aided by the weight P of the lumber pack 2b, when the pack is being transferred into the rack. Thus, during loading or unloading, the downward load P on the jig and support arms will cause an angle ($\alpha$) to be developed between the supporting arm 10a and the guiding means 13 of the jig 6. The skewed relation between the arm 10a and the guide means 13 will cause one part of the arm 10a to rest against an upper part of the opening of the guiding means 13, thereby developing a large frictional resistance F in the horizontal direction against moving the arm farther into the guide means 13.

This skewed relation between the supporting arm 10a and the guiding means 13 also entails that the supporting arm 10a at its end, which is within the guiding means 13, will rest against a bottom portion 21 of the guiding means 13, levering about the roller bearings 20a and 20b. Again, a large frictional resistance in the horizontal direction is created against moving the arm farther from the guide means 13. The skewed relation effectively locks the support arm 10a relative to the frame and rack.

If the lumber pack were stuck on its way into the rack, for example, due to an obstacle in the rack, the rollers 7a–7e of the jig 6 would still try to force the pack into the rack opening. Since the pack will not move, the force exerted by the rollers 7a–7e of the jig on the bottom of the pack will try to force the jig away from the rack, but the locked support arms will resist such movement. Because the hook-shaped means 12 securely interconnects the jig 6 to the rack, the jig 6 will not be allowed to be pushed away from the rack, and the rollers 7a–7e will ultimately revolve on the underside of the pack, or stop revolving due to a motor overload. As explained, the supporting arm 10a will not be telescoped farther out of the guide means 13.

Figures 3, 4, 5:
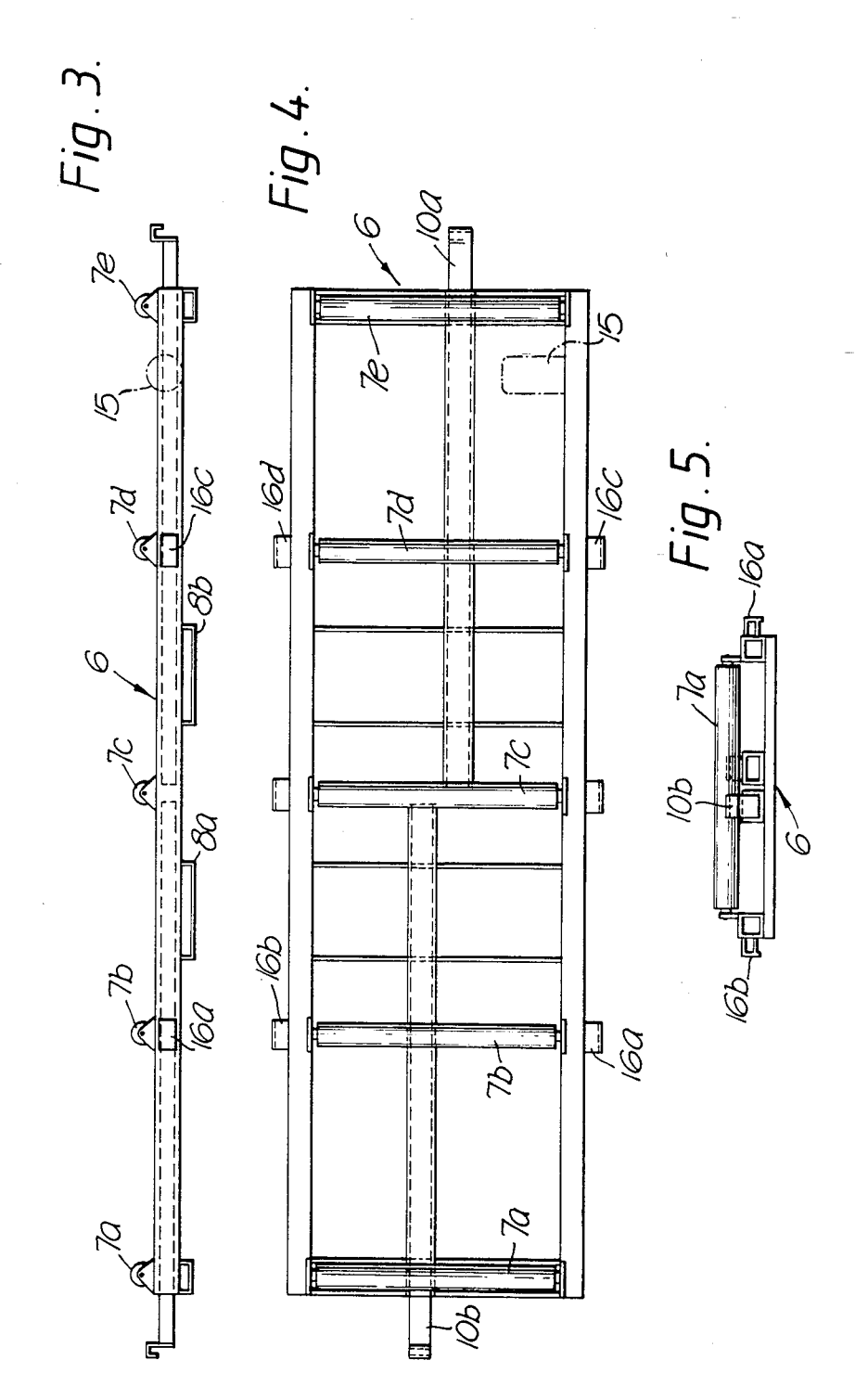
Figure 6:
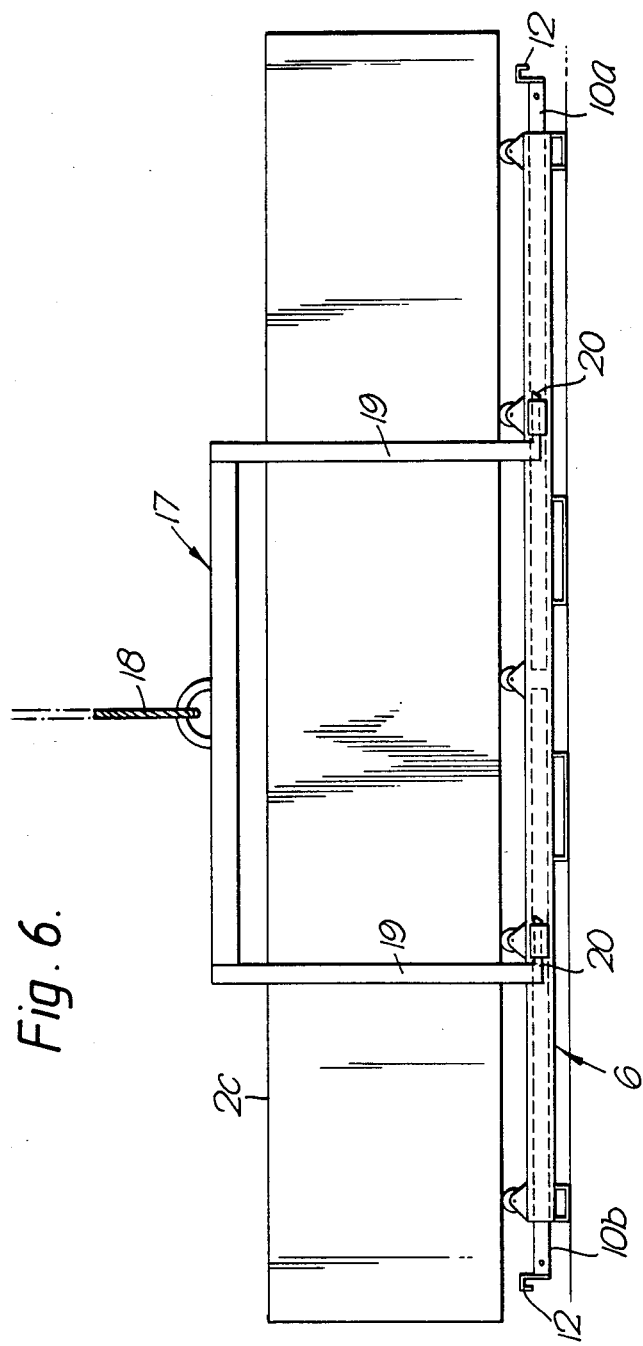
FIG. 6 illustrates a device according to the invention adapted for crane handling.

As illustrated in FIGS. 3, 4, and 5, the jig 6 also includes four lugs 16a, 16b, 16c, 16d which are adapted for engaging four attachment claws of a crane-lifting yoke 17, as further illustrated in FIG. 6. The lifting yoke 17, which is suspended in a hoisting rope 18, has four yoke legs 19, two of which are illustrated in FIG. 6, and which are each provided at their lower ends with an attachment claw 20. By suitable maneuvering of the hoisting yoke 17 above a loading pack 2c, each claw 2 can be brought into engagement with a lug 16a–16d of the jig 6.

When using the lifting yoke 17, the operation of the jig 6 largely corresponds to the truck-handling operation. The jig 6 (including the pack 2c) is lifted into position outside a rack opening, whereafter the operator pulls out at least one of the supporting arms so that the hook 12 will engage a corresponding supporting iron in the rack upon lowering the yoke 17 slightly below the opening. Thus, the skewed relation will be established to lock the support arm into position.

As mentioned above, the rollers 7a–7e of the jig can be motor driven, with power for the electric motor being supplied either via a suitable battery or via an extension cord connected between the jig and a conventional power outlet in the warehouse. The supporting arms can be provided with remote control extensibility so that the operator can automatically extend one of the arms hydraulically, pneumatically, or electrically a predetermined distance, depending on the position of the jig in front of the rack opening. The operator can then either be the crane operator, the forklift operator, or an assistant on the floor at another appropriate position suitable for supervision of pack transfer, and need not actually move the support arm manually.

The stroke length of the supporting arms can be varied within wide limits. In the disclosed embodiment, the stroke length can theoretically be as long as the entire length of the jig. Usually a stroke length will be approximately one-half the jig length for most practical purposes.

The supporting arms can have hooks other than those illustrated. Plugs can be used if desired, although hooks are preferred. If desired, magnetic/electromagnetic engagement means can be used.

I claim:

1. A jig (6) for handling of packs including elongated articles, especially lumber packs (2a, 2b), comprising a frame having transverse transport rollers (7a–7e) adapted to support the packs during handling, the frame being positioned in front of a rack opening in a rack, the rack having rollers (4a, 4b) for the transport and support of the packs so that the transfer of the pack between the jig (6) and the rack (1) can take place by rolling the pack from the rollers (7a–7e) on the jig (6) to the rollers (4a–4b) in the rack (1), the invention being characterized in that the jig (6) further comprises supporting arms (10a, 10b), each arm having a substantially hook-shaped means (12) at one end adapted for hooking onto a horizontal supporting iron (11a–11e) in the rack (1) below the rollers, the arms constituting a support for the device in a vertical direction during the transfer of the article to the rack, and including means for resisting the reaction forces which can develop in the horizontal direction when movement of the pack is blocked during the transfer, the resistance being created by a skewed relationship between each arm and a guide means.

2. The jig as claimed in claim 1, characterized in that the supporting arms (10a, 10b) in their position of use form an extension in the longitudinal direction of the structure, at least one supporting arm (10a, 10b) being provided at each transverse end of the frame.

3. The jig as claimed in claim 1 wherein each supporting arm (10a, 10b) can be displaced telescopically in a guiding means (13) mounted to the frame.

4. The jig as claimed in claim 1, further comprising tine-receiving means on the frame below the rollers adapted for receiving the tines of a lifting means (9a), for example, the tines of a forklift truck (9), the tine-receiving means being accessible from either side of the frame.

5. The jig as claimed in claim 1, further comprising a plurality of spaced lugs (16a–16d) on the top of the frame adapted for receiving claws (20) on a lifting yoke (17) so that the jig may be used in a crane operation.

6. The jig as claimed in claim 2, further comprising tine-receiving means on the frame below the rollers adapted for receiving the tines of a lifting means, such as the tines of a forklift truck, the tine-receiving means being accessible from either side of the frame.

7. The jig as claimed in claim 6, further comprising a plurality of spaced lugs (16a–16d) on the top of the frame adapted for receiving claws (20) on a lifting yoke (17) so that the jig may be used in a crane operation.

8. The device as claimed in claim 3, further comprising a plurality of spaced lugs (16a–16d) on the top of the frame adapted for receiving claws (20) on a lifting yoke (17) so that the jig may be used in a crane operation.

9. The jig as claimed in claim 3, further comprising power means attached to the frame for driving the rollers.

10. The jig of claim 9 wherein the power means includes an electric motor and chain driven by the motor.

11. The jig of claim 10 wherein the frame includes hollow side members and wherein the chain is hidden within a side member.

12. A device for handling of elongated articles, such as lumber packs, comprising:
   (a) a frame for holding the article, allowing elevation of the frame and article for off-loading, the frame including at least one support arm guide means;
   (b) a plurality of spaced, parallel, transverse rollers on top of the frame for supporting the article and allowing rolling movement of the article in a predetermined direction;
   (c) at least one support arm extensible from the guide means of the frame in the predetermined direction, the arm extending below the rollers to avoid interference with movement of the article above the arm on the rollers from the frame to the rack; and
   (d) connecting means on an end of the arm for securely connecting the arm and frame to a horizontal support iron of a storage rack,
wherein the arm constitutes a support for the device in a vertical direction during transfer of the article to the rack and an abutment for the jig against reaction forces which can develop in the horizontal direction when movement of the article is blocked during the transfer from the frame to the rack, the resistance being created by a skewed relationship between the arm and guide means.

13. The device of claim 12, further comprising at least one other support arm extensible from the frame opposite the first support arm from a second support arm guide means on the frame, the other support arm having a connection means for securely connecting the frame to the rack.

14. The device of claim 12 wherein the guide means includes a tubular receiver for telescoping interfitting engagement with the support arm so that the support arm may be retracted within the receiver and so that, when connected to the rack and loaded to form the skewed relationship, the arm frictionally engages the receiver at a skewed angle to limit extension or retraction of the support arm by the reaction forces.

15. The device of claim 14 wherein the frame includes forklift tine receivers on the bottom of the frame below the rollers, the tine receivers allowing raising of the frame with a forklift truck, and being accessible from either side of the frame.

16. The device of claim 14 wherein the connecting means includes a connection plate mounted substantially vertically to the end of the arm and a downwardly directed angle iron section at the top end of the connection plate for hooking to a horizontal support iron of the rack.

17. The device of claim 14, further comprising at least one roller bearing transversely mounted within the tubular receiver, the support arm fitting within the receiver above the roller bearing and pivoting about the roller bearing to form the skewed angle.

18. A device for handling of elongated lumber packs in a warehouse, comprising:
(a) a frame for holding the lumber pack;
(b) a plurality of parallel rollers mounted on the top of the frame to receive the pack, the pack rolling on the rollers during movement; and
(c) at least one extensible support arm mounted to the frame below the rollers in a tubular receiver, the arm including a connector for securely connecting the arm to a storage rack, the arm and receiver forming an abutment against horizontal reaction forces which could move the frame away from the rack by creating a skewed relationship wherein the support arm is locked within the receiver.

19. The device of claim 18, further comprising power means on the frame for driving the rollers in a predetermined direction.

20. The device of claim 19, further comprising tine-receiving means on the frame below the rollers for receiving the tines of a forklift truck, the means being accessible from either side of the frame, and wherein the tubular receiver includes at least one roller bearing transversely mounted within the receiver below the support arm, the bearing easing movement of the unloaded arm and being a fulcrum for the skewed relationship when the arm is loaded.

* * * * *